(12) United States Patent
Port et al.

(10) Patent No.: US 8,999,509 B2
(45) Date of Patent: Apr. 7, 2015

(54) WEATHER RESISTANT EXTERIOR FILM COMPOSITE

(75) Inventors: Anthony B. Port, Collinsville, VA (US); Scott E. Pickett, Martinsville, VA (US); Steven A. Barth, Martinsville, VA (US)

(73) Assignee: CPFilms Inc., Fiedale, VA (US)

(*) Notice: Subject to any disclaimer, the term of this patent is extended or adjusted under 35 U.S.C. 154(b) by 0 days.

(21) Appl. No.: 13/433,920

(22) Filed: Mar. 29, 2012

(65) Prior Publication Data

US 2012/0276373 A1 Nov. 1, 2012

Related U.S. Application Data

(60) Provisional application No. 61/479,531, filed on Apr. 27, 2011.

(51) Int. Cl.
| | | |
|---|---|---|
| *C09D 175/16* | (2006.01) | |
| *C09D 133/08* | (2006.01) | |
| *C09D 133/18* | (2006.01) | |
| *C08L 75/04* | (2006.01) | |
| *C08L 75/16* | (2006.01) | |
| *C09D 133/14* | (2006.01) | |
| *C08L 33/08* | (2006.01) | |
| *C08L 33/14* | (2006.01) | |

(52) U.S. Cl.
CPC ........... *C09D 133/08* (2013.01); *Y10T 428/265* (2015.01); *C09D 133/14* (2013.01); *C08L 33/08* (2013.01); *C08L 33/14* (2013.01); *C09D 175/16* (2013.01); *C08L 2205/03* (2013.01)

(58) Field of Classification Search
USPC ............... 428/336, 423.7; 522/93, 96, 97, 98, 522/174, 30, 111; 524/539; 528/59, 60, 65, 528/66
See application file for complete search history.

(56) References Cited

U.S. PATENT DOCUMENTS

| | | | |
|---|---|---|---|
| 3,043,709 | A | 7/1962 | Amborski |
| 4,115,617 | A | 9/1978 | Mitsuishi et al. |

(Continued)

FOREIGN PATENT DOCUMENTS

| | | |
|---|---|---|
| DE | 19754107 C1 | 2/1999 |
| DE | 10034197 A1 | 1/2002 |

(Continued)

OTHER PUBLICATIONS

Notification of Transmittal of the International Search Report and the Written Opinion of the International Searching Authority with Date of Mailing Oct. 31, 2012 for International Application No. PCT/US2012/031520.

(Continued)

*Primary Examiner* — Thao T Tran
(74) *Attorney, Agent, or Firm* — James K. Leonard

(57) ABSTRACT

This invention relates to film composites with a single coating of hard coat material which have a significant improved adhesion together with improved weather resistance while also increasing resistance to abrasion and cracking. In one embodiment, this film composite is comprised of a transparent base sheet having on one side thereof a weather resistant hard coat comprised of: at least one multifunctional acrylate monomer or oligomer; a dual-curable resin comprising an aliphatic urethane acrylate resin having isocyanate functional groups and an aliphatic urethane acrylate having hydroxyl functional groups; an ultraviolet (UV) stabilizer; and a photoinitiator.

19 Claims, 1 Drawing Sheet

(56) References Cited

U.S. PATENT DOCUMENTS

| | | | |
|---|---|---|---|
| 4,185,046 A | 1/1980 | Pengilly et al. | |
| 4,425,981 A | 1/1984 | Kiesewetter et al. | |
| 4,555,433 A | 11/1985 | Jablonka et al. | |
| 4,557,980 A | 12/1985 | Hodnett, III | |
| 4,978,181 A | 12/1990 | Inanuma et al. | |
| 5,618,626 A | 4/1997 | Nagashima et al. | |
| 5,665,801 A | 9/1997 | Chang et al. | |
| 5,740,649 A | 4/1998 | Fuchs et al. | |
| 6,007,901 A | 12/1999 | Maschwitz et al. | |
| 6,221,112 B1 | 4/2001 | Snider | |
| 6,416,872 B1 | 7/2002 | Maschwitz | |
| 6,420,451 B1 | 7/2002 | Lin et al. | |
| 6,440,551 B1 | 8/2002 | Enniss et al. | |
| 6,500,876 B2 * | 12/2002 | Weikard et al. | 522/92 |
| 6,562,440 B1 | 5/2003 | Tsuchiya et al. | |
| 6,569,928 B1 | 5/2003 | Levchik et al. | |
| 6,773,778 B2 | 8/2004 | Onozawa et al. | |
| 6,998,425 B2 | 2/2006 | Chisholm et al. | |
| 7,375,144 B2 * | 5/2008 | Gilmer | 522/92 |
| 8,617,715 B2 | 12/2013 | Shively et al. | |
| 2003/0036604 A1 | 2/2003 | Meisenburg et al. | |
| 2003/0171449 A1 | 9/2003 | Nienhaus et al. | |
| 2004/0209020 A1 | 10/2004 | Castiglione et al. | |
| 2004/0242735 A1 | 12/2004 | McMan et al. | |
| 2005/0121665 A1 | 6/2005 | Gillissen et al. | |
| 2006/0134400 A1 | 6/2006 | Takada et al. | |
| 2006/0216524 A1 | 9/2006 | Klun et al. | |
| 2008/0166569 A1 | 7/2008 | Gasworth et al. | |
| 2009/0162592 A1 * | 6/2009 | Baikerikar et al. | 428/38 |
| 2009/0181242 A1 | 7/2009 | Enniss et al. | |
| 2009/0297724 A1 | 12/2009 | Weber | |
| 2011/0027553 A1 * | 2/2011 | Enniss et al. | 428/213 |

FOREIGN PATENT DOCUMENTS

| | | |
|---|---|---|
| EP | 0 928 800 A1 | 7/2009 |
| JP | 05230281 A | 7/1993 |
| JP | 2004277629 A | 10/2004 |
| KR | 10-0759101 | 9/2007 |
| WO | 9606885 A1 | 3/1996 |
| WO | 9929979 A1 | 6/1999 |
| WO | 0168360 A1 | 9/2001 |
| WO | 2006008518 A1 | 1/2006 |
| WO | 2009087575 A2 | 7/2009 |
| WO | WO 2009/086285 A1 | 7/2009 |

OTHER PUBLICATIONS

USPTO Office Action for U.S. Appl. No. 12/812,010 dated Mar. 25, 2014.
USPTO Office Action for U.S. Appl. No. 12/812,010 dated Dec. 15, 2014.
Masson et al.; "UV-radiation curing of waterbased urethane-acrylate coatings." Progress in Organic Coatings, 39 (2000); pp. 115-126, (accepted on Aug. 20, 2000).
International Search Report for International Application No. PCT/EP2004/013518 mailed Jun. 30, 2005.
International Search Report for International Application No. PCT/IB2009/005001 mailed Jul. 20, 2009.
Copending U.S. Appl. No. 12/812,010, filed Sep. 27, 2010, Enniss et al.
Copending U.S. Appl. No. 10/729,587, filed Dec. 6, 2003, Shively et al.
USPTO Office Action for U.S. Appl. No. 10/729,587 dated Dec. 16, 2004.
USPTO Office Action for U.S. Appl. No. 10/729,587 dated Jun. 3, 2005.
USPTO Office Action for U.S. Appl. No. 10/729,587 dated Feb. 2, 2006.
USPTO Office Action for U.S. Appl. No. 10/729,587 dated Jul. 14, 2006.
USPTO Office Action for U.S. Appl. No. 10/729,587 dated Jan. 22, 2007.
USPTO Office Action for U.S. Appl. No. 10/729,587 dated Aug. 8, 2007.
USPTO Office Action for U.S. Appl. No. 12/812,010 dated Oct. 9, 2012.
USPTO Office Action for U.S. Appl. No. 12/812,010 dated May 8, 2013.
Kasten, Dr. Uwe; "Organic Light Stabilizers for Industrial Coatings"; Ciba Spezialitatenchemie Lampertheim GmbH, (provided by Applicants on Oct. 4, 2013).
Sartomer Company, Inc.; Technical Data Sheet: CN962, (provided by Applicants on Oct. 4, 2013).
Sartomer Company, Inc.; Technical Data Sheet: CN983, (provided by Applicants on Oct. 4, 2013).
USPTO Notice of Allowance for U.S. Appl. No. 10/729,587 dated Aug. 21, 2013.

* cited by examiner

WEATHER RESISTANT EXTERIOR FILM COMPOSITE

CROSS REFERENCE TO RELATED APPLICATION(S)

This application claims the benefit of U.S. Provisional Patent Application Ser. No. 61/479,531, filed Apr. 27, 2011, the entire disclosure of which is incorporated by reference herein.

BACKGROUND OF THE INVENTION

1. Field of the Invention

This invention relates to exterior window film composites which are adhered to the outside of window glazing and typically, but not exclusively, to the window glazing of buildings.

2. Description of Related Art

Window film is adhered to the outside of windows for many different reasons. For example, the adhered film may protect the window and prevent the shattering of glass when the window is impacted. Window films are also utilized for solar control purposes in order to reflect or absorb light at particular wavelengths. Generally, the window film comprises a base film or film laminate which is provided with a hard coat layer on its external surface, as is disclosed, for example, in U.S. Pat. No. 6,773,778.

The film surface to which the hard coat layer is applied may additionally be subjected, if desired, to surface treatment by an oxidation method or a roughening method for the purpose of improving the adhesion between the surface of the film and the hard coat layer provided on the surface thereof.

Exterior window films such as those described in U.S. Pat. No. 6,773,778, however, typically fail in 600-900 hours when cycled in an Atlas Xenon Weatherometer, according to ASTM G 155, due to loss of adhesion between the hard coat and the base film material as measured by tape testing as per ASTM D 3359 as modified as described later. This equates to a service life of the films of about 18 to 24 months, at which point the film can fail due to the loss of hard coat adhesion to the base substrate. In other words, the protective hard coat cracks and begins to flake off from the base sheet. As a result, the entire window film must be replaced, which can be a burdensome process, particularly when adhered to elevated windows.

WO 2009/087575 [U.S. Pat. Pub. No. 2011/0027553] describes window films having very thick acrylic based primers or undercoat layers provided on one face of the base material with a polyurethane acrylate oligomer hard coat applied over the primer or undercoat layer. These window films have an increased resistance to weathering when compared to the prior window films, but these windows utilize a costly two-coat system and typically last only about 2700 hours to 3000 hours during accelerated weathering tests—equating to about four years of service life.

U.S. Patent Pub. No. 2003/0036604 describes an undercoat layer based on a dual-curable resin comprised of an acrylate polyisocyanate and a hydroxyl-containing (meth)acrylate copolymer. This coating, however, is not scratch resistant and results in a window film with weatherability of less than about 1800 hours.

Given the endless need to improve efficiency and lower costs, what is needed in the art is an exterior window film laminate with increased adhesion of the hard coat to a base sheet and improved weather resistance and service life and which eliminates the need for a two coat system, i.e., which comprises only a single coating of hard coat material on the base sheet.

SUMMARY

Because of these and other problems in the art, described herein, among other things, is a weather resistant film composite comprising: a base sheet; and a cured hard coat layer disposed on the base sheet. The cured hard coat layer is formed from a composition comprising: a multifunctional acrylate; an aliphatic urethane acrylate resin having isocyanate functional groups; an aliphatic urethane acrylate resin having hydroxyl functional groups; an ultraviolet stabilizer; and a photoinitiator.

In certain embodiments, the multifunctional acrylate is a monomer or oligomer acrylate selected from the group consisting of: dipentaerythritol pentaacrylate, pentaerythritol tetraacrylate, pentaerythritol triacrylate, ditrimethylolpropane tetraacrylate, trimethylolpropane triacrylate, tricyclodecane dimethanol diacrylate, 1,6-hexanediol diacrylate, cyclohexane dimethanol diacrylate, dioxane glycol diacrylate, and combinations thereof. In some of these embodiments, the multifunctional acrylate comprises dipentaerythritol pentaacrylate. In other embodiments, the film composite has a weatherability exceeding 3000 hours before loss of adhesion between the base sheet and the hard coat. The hard coat also may have an abrasion delta haze of less than about 4 percent as measured by a taber abrasion test.

In some embodiments, the hard coat has a dry film thickness of about 6 microns to about 14 microns. In other embodiments, the hard coat has a dry film thickness of about 9 microns to about 12 microns.

The base sheet may comprise at least one film comprised of polyethylene terephthalate. The base sheet also may comprise an ultraviolet absorber. In certain embodiments, the hard coat composition comprises up to about 3.5 weight percent of organic ultraviolet stabilizer. In other embodiments, the 3.5 weight percent of organic ultraviolet stabilizer includes up to about 2 weight percent of organic ultraviolet absorber. In other embodiments, the film composite is applied to the external surface of a window. In still other embodiments, the hard coat composition can further comprise up to about 4 weight percent hydrophobic material. The film composite also may have a visible light transmission of about 5 percent to about 85 percent.

Also described herein is a hard coat composition for improving the weather and abrasion resistance of a base sheet, the hard coat comprising: a multifunctional acrylate selected from the group consisting of: dipentaerythritol pentaacrylate, pentaerythritol tetraacrylate, pentaerythritol triacrylate, ditrimethylolpropane tetraacrylate, trimethylolpropane triacrylate, tricyclodecane dimethanol diacrylate, 1,6-hexanediol diacrylate, cyclohexane dimethanol diacrylate, dioxane glycol diacrylate, and combinations thereof; and dual-curable resin. The dual-curable resin comprises: an aliphatic urethane acrylate resin having isocyanate functional groups; and an aliphatic urethane acrylate resin having hydroxyl functional groups. The ratio of aliphatic urethane acrylate resins having isocyanate functional groups to aliphatic urethane acrylate resins having hydroxyl functional groups in the dual-curable coating is adjusted so that the ratio of isocyanate to hydroxyl functional groups is generally about 1.1 to 1.

In certain embodiments, the multifunctional acrylate comprises dipentaerythritol pentaacrylate. In other embodiments, the hard coat composition is cured in a two-stage process. In still other embodiments, the aliphatic urethane acrylate resin having isocyanate functional groups has an isocyanate content of about 6.5 percent to about 7.0 percent and the aliphatic urethane acrylate resin having hydroxyl groups has a hydroxyl value of about 75 to about 110 mg of KOH/g.

Also discussed herein is a weather resistant film composite comprising: a base sheet; and a cured hard coat disposed on the base sheet. The cured hard coat comprises: a multifunctional acrylate; an aliphatic urethane acrylate resin having isocyanate functional groups; an aliphatic urethane acrylate resin having hydroxyl functional groups; an ultraviolet stabilizer; and a photoinitiator. In certain embodiments, the ratio of aliphatic urethane acrylate resins having isocyanate functional groups to aliphatic urethane acrylate resins having hydroxyl functional groups in the dual-curable coating is adjusted so that the ratio of isocyanate to hydroxyl functional groups is generally about 1.1 to 1.

DETAILED DESCRIPTION OF PREFERRED EMBODIMENTS

Figure 1:
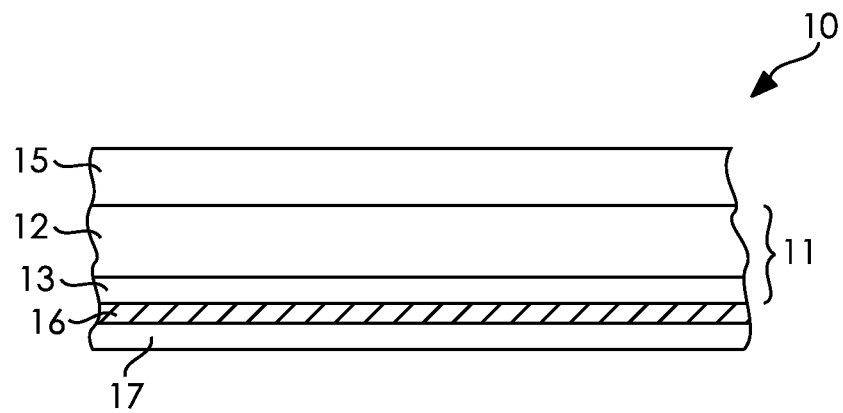
FIG. 1 is a cross-sectional view of one embodiment of a weather resistant exterior film composite.

Described herein, among other things, are film composites with a single coating of hard coat material which have a significantly improved adhesion together with improved weather resistance while also increasing resistance to abrasion and cracking. In one embodiment, this film composite is comprised of a transparent base sheet having on one side thereof a weather resistant hard coat comprised of: at least one multifunctional acrylate monomer or oligomer; a dual-curable resin comprising an aliphatic urethane acrylate resin having isocyanate functional groups and an aliphatic urethane acrylate resin having hydroxyl functional groups; an ultraviolet (UV) stabilizer; and a photoinitiator.

The hard coat coating advantageously improves the adhesion of the hard coat to the base sheet, and as a result, the resistance of the film composite to weathering. The improved performance is accomplished with the use of a single coating of hard coat and without the need for a second hard coat or primer layer, and as a result, the film composite can be produced more efficiently and at a lower cost. The improved weatherability results in a film composite that exceeds 3000 hours of adhesion during weathering tests, the equivalent of at least 5 to 7 years in service life of the film composite.

The film composites are typically applied to the exterior surface of a window, although this is by no means necessary. As used herein, the "top" is the side of the film composite that is exposed to the "weather." In this regard, the hard coat is on the top of the film composite and exposed to the exterior elements, which provides for the improved weatherability of the film composite and adhesion of the hard coat to the base sheet.

It should be noted, however, that while the film composites are often specifically discussed for use as window films in this application, it would be understood by one of ordinary skill that numerous other applications are appropriate. For example, the film composite could be utilized as a glazing and adhered to any suitable transparent sheet or film including, but not limited to, motorcycle helmet visors, vehicle windshields and windscreens, aircraft canopies, computer monitor screens, and the like. In this regard, the glazing material could be comprised of any suitable substrate, including, but not limited to, glass, acrylic sheets, polyester sheets, polycarbonate sheet, and the like. Further, the film composite also could be used to protect the surface of photovoltaic cells and solar concentrators. These additional uses are merely exemplary and are in no way limiting. Accordingly, it should be understood that when use as window film is described in this application, other uses also apply, as would be known to one of ordinary skill in the art.

It also should be noted that while the hard coat layer is specifically discussed for use in film composites in this application, it would be understood by one of ordinary skill that numerous other applications are appropriate. As noted above, the hard coat layer has improved adhesion and weatherability. In this regard, the hard coat layer could be utilized in any application in which weather resistance and adhesion is desired. For example, the hard coat layer could be applied to wood or metal base sheet surfaces as a varnish, lacquer, vehicle refinish, coil coating, or the like.

In order to understand the film composite of the present disclosure, it is also important to have an understanding of the properties and characteristics associated with a film composite and the tests by which these properties and characteristics of a film composite are measured.

The "weatherability" of film composites is a measure of how well the product withstands the rigors of exposure to the weather. Generally, film products may fail in many ways, including yellowing, embrittlement, delamination, distortion, fading and loss of solar and optical performance. The primary cause of premature failure in exterior film products, though, has been the loss of adhesion of the outermost (top) hard coat. Thus, as used herein, "weatherability" is a measure of the longevity of adhesion of the hard coat to the base sheet after subjecting the film composite to weathering. The film composites are weathered using an Atlas Xenon Weatherometer according to ASTM G 155 and then tested for adhesion of the hard coat every 300 hours and then also tested for laminate separation. The adhesion test was in accordance with ASTM D 3359, but the samples were not cross-hatched, cleaned or marked prior to testing. Tape (3M 810) was pressed onto the sample surfaces and left for approximately 10 seconds and then pulled off at a 180° angle. Samples of hard coat were evaluated on a pass/fail determination, i.e., any detachment of the hard coat, at every 300 hours. The film composites were also evaluated for delamination. The film composites of the current disclosure have a life expectancy—i.e., before failure of the adhesion as shown by any detachment of the hard coat from base sheet material—of greater than about 2700 hours; greater than about 3000 hours; about 2700 hours to about 3000 hours; and greater than about 3300 hours. Stated differently, the film composites of the current disclosure did not exhibit any detachment of the hard coat from the base sheet after the above described testing method until greater than about 2700 hours; greater than about 3000 hours; about 2700 hours to about 3000 hours; and greater than about 3300 hours. Moreover, the film composites of the current disclosure did not exhibit any laminate separation until greater than about 4200 hours; greater than about 5400 hours; and greater than about 6000 hours.

The Taber Abrasion Test is a commonly utilized test for window films and other films for glazing or display applications to measure the resistance to abrasion of the films. This test uses a Taber Abrader in accordance with ASTM D 1044 using CS-T3 wheels each loaded to 500 grams. As the wheels scratch and grind the surface, the films become more hazy. Thus, the delta haze is the measure of change in haziness of a film after being subjected to the abrasion of the wheel. The results are quoted in delta haze value after 50 cycles of the wheel. For example, a polyester film will generally have a delta haze of about greater than 30%. The film composites, and specifically the hard coat, of the current disclosure have an abrasion delta haze of less than about 12.0%; less than about 8.0%; less than about 5.0%; less than about 4.0%; and about 3.0% to about 5.0%.

The surface energy is a measure of the hydrophobicity of the film composites, i.e., the ability of film composite to repel liquids and other materials such as dirt. The lower the surface energy of the film, the greater is the resistance of the surface to wetting by liquids (higher contact angles) and thus the lower the liquid and dirt retention. The surface energy is calculated by measuring the contact angle between a 1 μl drop of distilled water and diiodomethane (DIM) on a sample of film using a Data Physics OCA 20 instrument. The film composites of the current disclosure have a surface energy of less than about 45 millijoule per square meter ($mJ/m^2$); less than about 16 $mJ/m^2$; and about 16 $mJ/m^2$ to about 45 $mJ/m^2$.

The visible light transmission is the percent of total visible light that is transmitted through the window film/glass system. The lower the number, the less visible light transmitted. It is calculated using CIE Standard Observer (CIE 1924 1931) and D65 Daylight. The film composites of the present disclosure have a visible light transmission of less than about 1% to about 88%; greater than about 1%; and up to about 88%.

With reference to FIG. 1, there is shown a film composite (10) comprising a base sheet (11), a hard coat (15), an adhesive layer (16), and a release liner (17). To prevent or inhibit photodegradation of the film composite, at least one ultraviolet (UV) light stabilizer discussed below may additionally be incorporated into or applied to the hard coat or one or more of the other layers comprising the film composite.

Some UV stabilizers quench excited states of atoms capable of initiating undesired breakdown chemical reactions. One known UV stabilizer is nickel phenolate, which may be found in Cyasorb® UV 1084 (available from Cytec Industries, Inc.). Some UV stabilizer additives scavenge radicals formed during photodegradation of molecules upon weathering. Examples of these UV stabilizer scavengers are hindered phenolics such as Irganox® 565 (available from BASF Corp.) or hindered benzoates such as Cyasorb® UV 2908 (available from Cytec Industries, Inc). Hindered amines are also useful for scavenging radicals to protect the coating ingredients from breakdown. Examples of hindered amines include Cyasorb® 3346 (available from Cytec Industries, Inc) and Tinuvin® 123 and Tinuvin® 152 (available from BASF Corp.). Hydroperoxide decomposition is another method for preventing chemical breakdown during weathering of coatings. The peroxides formed can be arrested by thioesters such as Cyanox® LTDP (available from Cytec Industries, Inc.) and nickel dibutyl dithiocarbamates such as anti-ozononant NiBud (available from Akrochem).

UV stabilizers include materials that inhibit photoinitiation by absorbing UV light, known as UV absorbers ("UVAs"). UVAs function by competitively absorbing the UV energy that causes photodegradation of the structure. A wide variety of both organic and inorganic materials function as UV-absorbing compounds. Examples of organic UVAs include, but are not limited to, benzophenones (e.g., Cyasorb® UV-531 (available from Cytec Industries, Inc.) and Uvinul® 3008 (available from BASF Corp.)), benzotriazoles (e.g., Cyasorb® UV-5411 (available from Cytec Industries) and Tinuvin® 329, Tinuvin® 360, and Tinuvin® 571 (available from BASF Corp.)), triazines (e.g., Cyabsorb® UV-1164 (available from Cytec Industries, Inc.) and Tinuvin® 400, Tinuvin® 460, Tinuvin® 477, and Tinuvin® 479 (available from BASF Corp.)), oxanilides (e.g., Tinuvin® 312 (available from BASF Corp.) and Sanduvor® VSU (available from Clariant AG)), benzoxazinones (e.g., Cyabsorb® UV-3638 (available from Cytec Industries, Inc.)), cyanoacrylates (e.g., Uvinul® 3039 (available from BASF Corp.)), and benzilidine malonates (e.g., Hostavin® PR-25 (available from Clariant AG)). Examples of inorganic UVAs include titanium dioxide, zinc oxide, and cerium oxide which are added in the form of small particles, preferably as nanoparticles.

In the disclosed embodiment, the base sheet (11) is a multi-layered, transparent polymeric solar control film laminate comprised of a first film layer (12) of a transparent polyester film laminated to a metallized film layer (13). Both the first film layer (12) and the metallized film layer (13) comprise polyethylene terephthalate (PET) film.

The first film layer (12) of the base sheet (11) preferably comprises a surface treated PET film having a thickness of about 0.0125 mm to 0.18 mm (½ to 7 mil). The layer which receives the hard coat, the first film layer (12) comprised of PET film in the disclosed embodiments, is preferably chemically treated with an acrylic surface treatment to improve adhesion thereto. The surface treatment may include any suitable method, including an oxidation or a roughening method. The oxidation method may include, but is not limited to, corona discharge treatment, chromic acid treatment (wet type), flame treatment, hot air treatment, ozone and UV ray irradiation treatment. The first layer (12) may also include a UV absorber as is described in U.S. Pat. No. 6,221,112 (the entire disclosure of which is incorporated herein by reference) so as to absorb on the order of 99% of UV radiation. The metallized film layer (13) preferably comprises a PET film with a thin coating of an evaporated or sputtered metal or metal alloy that reflects and/or absorbs a portion of solar radiation in the visible and infrared (IR) wavelengths while allowing a sufficient amount of visible light transmission to maintain a desired level of transparency. Examples of suitable PET films include Melinex® 454 and ST505 polyester films (available from DuPont Teijin Films).

It should be noted that while the base sheet (11) is a solar control film laminate in the disclosed embodiment, one of ordinary skill in the art would readily recognize that the base sheet (11) could alternatively be a single layer, or multiple layers, of any type of film, including, but not limited to, polycarbonate film, polyethylene naphthalate (PEN) film, safety film, solar control films, anti-graffiti film, or protective film for photovoltaic cells, solar concentrators and the like. Examples of other solar control films are disclosed in U.S. Pat. Nos. 6,416,872 and 6,007,901 (the entire disclosures of which are incorporated herein by reference).

Figure 2:
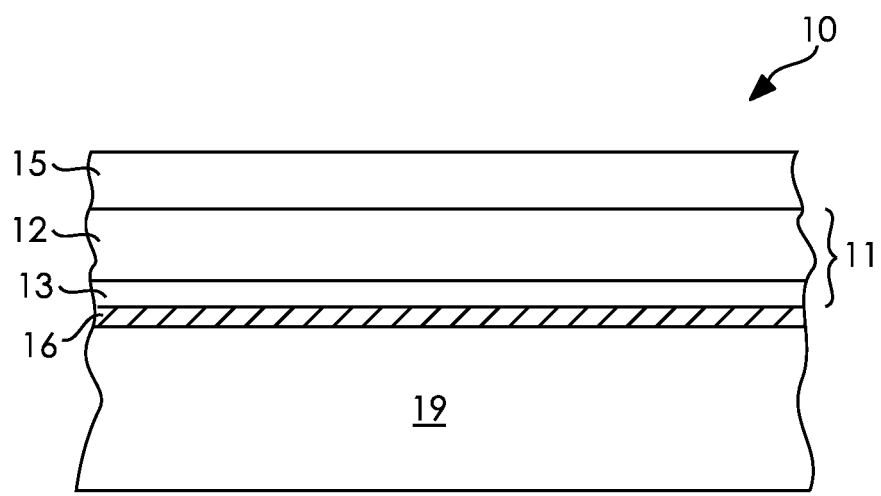
FIG. 2 is a cross-sectional view of an embodiment of a glazing panel with the weather resistant exterior film composite depicted in FIG. 1.

The base sheet (11) may additionally have provided on its bottom a means for adhering the film composite (10) to a window, glazing, or other substrate. As shown in FIG. 2 for example, the composite (10) has an adhesive layer (16) for adhering the film composite (10) to a glazing (19). The adhesive layer (16) can be comprised of any adhesive that is suitable for bonding the base sheet (11) to a window, wall or any other substrate. When being bonded to a window, pressure sensitive adhesives are preferable, with an acrylic based adhesive being particularly preferable. An example of an adhesive for use in the adhesive layer includes Gelva® 263 (available from Cytec Industries, Inc.), which preferably contains up to 8 wt % UV absorber, typically a hydroxy benzophenone type such as Maxgard® 900 (available from Syrgis Performance Specialties). The specific adhesive used is not limited, and other adhesives that are known to one skilled in the art and that are commonly used for adhering films such as solar control films, anti-graffiti film or safety film to glazing may also be used. The adhesive layer (16) may also have a release liner (17) attached thereto. The release liner (17) advantageously provides a release effect against the sticky adhesive layer (16). The release liner (17) in the depicted embodiment could include a polyethylene coated paper, a silicone release liner, or other liners known in the art, that can be peeled from the adhesive layer (16) leaving the adhesive layer (16) on the base sheet (11). Alternatively, the adhesive and release layers may comprise a clear distortion free adhesive with a polypropylene liner.

The base sheet (11) is coated on its top, exterior side with hard coat (15) comprised of: at least one multifunctional acrylate; a dual-curable resin comprising an aliphatic urethane acrylate resin having isocyanate functional groups and an aliphatic urethane acrylate resin having hydroxyl functional groups; an ultra violet (UV) stabilizer; and a photoinitiator. The hard coat (15) is applied onto the first layer (12) of the base sheet (11) as a liquid composition through the addition of solvent and with the constituents discussed more fully below. The solvent is added to aid in the application of the wet hard coat (15) to the base sheet (11), and all or essentially all the solvent evaporates upon drying. In this regard, the "hard coat composition," as used herein, refers to both a wet hard coat composition including solvent and a final, dried hard coat composition with the solvent evaporated (product of the curing and reactions below). The constituents of the compositions discussed below, though, are based on weight percentages with the inclusion of the solvent; however, one of ordinary skill in the art would readily appreciate that the below described weight percentages could vary depending on the amount and type of solvent included in the wet hard coat composition, and the final, dried hard coat composition will have different weight percentages with the solvent evaporated.

The liquid hard coat composition can be applied by any suitable method or process known in the art, including, but not limited to, bar coating, slot die coating, or the reverse gravure process. The hard coat composition is applied in an amount sufficient to provide a dry film thickness of between about 6 microns and about 14 microns, and preferably between about 9 microns and about 12 microns.

The hard coat (15) is then subjected to a two-stage curing process: thermal and UV. The hard coat (15) is first dried in an oven at a temperature of about 100° C. to about 105° C. for a total time of about 60 seconds to about 90 seconds. This thermal curing creates and promotes a polyaddition reaction between the isocyanate and hydroxyl groups of the aliphatic urethane acrylate resins. The hard coat (15) is then UV cured under inert conditions, preferably under nitrogen with an oxygen content of between 800 and 1600 ppm, which causes the multifunctional acrylate monomer or oligomer to cross-link through the urethane acrylate groups.

The preferred method of UV curing is using UV light having a wavelength between about 360 to 440 nm, preferably with UV light having a wavelength of about 395 to 440 nm. A variety of UV light sources can be employed. Representative sources include, but are not limited to: a Fusion™ H-bulb high-intensity mercury lamp, which emits three bands centered at 254, 313, and 365 nm; a Fusion™ D-bulb iron-doped mercury lamp, which emits bands at 380 to 400 nm but which may emit less at lower wavelengths; and a Fusion™ V-bulb gallium-doped mercury lamp, which emits bands at 404 to 415 nm but which may emit less at lower wavelengths (all of which are commercially available from Fusion UV Systems, Inc.). In general, lower wavelengths promote surface cure, and higher wavelengths promote bulk cure. A Fusion™ D-bulb is particularly preferable as it generally represents a UV light source with a desirable overall balance of properties.

The hard coat (15) acts as a protective barrier to the underlying layers. Additionally, the hard coat (15) of the current disclosure exhibits an improved adhesion to the underlying layers which provides the film composite (10) with the necessary resistance to abrasion and weathering.

As noted above, solvent is also added to aid in the application of the wet hard coat (15) to the base sheet (11), and all or essentially all the solvent evaporates upon drying. Thus, the constituents of the compositions discussed below are based on weight percentages with the inclusion of the solvent; however, one of ordinary skill in the art would readily appreciate that the below described weight percentages could vary depending on the amount and type of solvent included in the wet hard coat (15) composition, and the final, dried hard coat (15) will have different weight percentages with the solvent evaporated.

As described more fully above, the hydroxyl functional aliphatic urethane acrylates and the isocyanate functional aliphatic urethane acrylates of the dual-curable resin mainly take part in the polyaddition reaction during the thermal curing, which helps promote the adhesion of the hard coat (15) to the first layer (12) of the base sheet (11). Although the aliphatic urethane acrylate resin having isocyanate functional groups and the aliphatic urethane acrylate resin having hydroxyl functional groups are generally referred to herein as a dual-curable resin, the two aliphatic urethane acrylate resins could be added separately and individually as part of the hard coat composition. In any event, the composition of the hard coat (15) preferably comprises about 40 to about 47 weight percent (wt %) dual-curable resin, which includes about 21 wt % to about 25 wt %, and most preferably about 23 wt %, aliphatic urethane acrylate resins having isocyanate functional groups, and about 19 wt % to about 22 wt %, and most preferably about 20 wt %, aliphatic urethane acrylate resin having hydroxyl groups. As noted above, however, these weight percentages include the addition of the solvent and could vary depending on the amount and type of solvent used. The weight percentages could further vary with the addition of the additives discussed below and will change with the evaporation of the solvent. In any event, the ratio of aliphatic urethane acrylate resins having isocyanate functional groups to aliphatic urethane acrylate resins having hydroxyl functional groups in the dual-curable coating is adjusted so that the ratio of isocyanate to hydroxyl functional groups is generally about 1.1 to 1.

In the dual-curable resin, suitable aliphatic urethane acrylate resins having isocyanate functional groups preferably have an isocyanate content of 6.5 to 7.0% (measured in accordance with DIN-EN ISO-11 909). An example of a suitable aliphatic urethane acrylate resin having isocyanate functional groups includes a material comprising a urethane acrylate oligomer of 90 wt % solids in n-butyl acetate such as Desmolux™ XP 2510 (available from Bayer). A suitable aliphatic urethane acrylate resin having hydroxyl groups preferably has a hydroxyl value of 75 to 110 mg of KOH/g. Examples of suitable materials include Ebecryl® 8210 acrylate (available from Cytec Industries, Inc.) and urethane acrylate 00-022 (available from Rahn USA Corp.).

The multifunctional acrylate is either a monomer or oligomer and is mainly utilized in the UV initiated cross-linking curing stage, discussed above, which advantageously increases the stiffness of the film composite (10) and improves both the abrasion and scratch resistance. Additionally, the hydroxyl groups present in the multifunctional acrylate may also take part in the polyaddition reaction, discussed above, which can help promote the adhesion of the hard coat (15) to the first layer (12) of the base sheet (11).

The composition of the hard coat (15) preferably comprises about 17 wt % multifunctional acrylate monomer or oligomer. Again, this weight percent could vary depending on the amount, type, and evaporation of solvent and with the addition of the additives discussed below. Examples of suitable multifunctional acrylate monomers for use in the coating composition are diacrylates or a mixture of polyacrylates. The preferred multifunctional acrylates include, but are not limited to, dipentaerythritol pentaacrylate, pentaerythritol tetraacrylate, pentaerythritol triacrylate, ditrimethylolpropane tetraacrylate, trimethylolpropane triacrylate, tricyclodecane dimethanol diacrylate, 1,6-hexanediol diacrylate, cyclohexane dimethanol diacrylate, dioxane glycol diacrylate, and combinations thereof. A particularly preferred polyacrylate is dipentaerythritol pentaacrylate (available as Sartomer SR399 from Sartomer LLC). The preferred multifunctional acrylate oligomers include, but are not limited to, CN985B88 and CB2920 (from Sartomer LLC).

The hard coat composition preferably comprises up to 2 wt % of an organic UVA and about 1 wt % to about 3.5 wt % in total of organic UV stabilizers (including the UVA at up to 2% by weight of the UVA). These weight percentages are merely preferable and in no way limiting; for example, other less effective UV stabilizers might require larger amounts by weight to be added to the composition as would be known by one of ordinary skill in the art. Additionally, any UV stabilizer could be utilized, including the UV stabilizers (and UV absorbers as a subset of UV stabilizers) discussed above. In a preferred embodiment, the hard coat composition comprises hydroxyphenyl-triazine (e.g., Tinuvin® 477 UVA available from BASF) and a hindered amine based material (e.g., Tinuvin® 152 UV stabilizer available from BASF).

In general, the photoinitiator(s) is at least partially soluble (i.e., at the processing temperature of the resin) and substantially colorless after being polymerized. The photoinitiator may be colored (e.g., yellow), provided that the photoinitiator is rendered substantially colorless after exposure to the UV light source. The photoinitiator is generally added at about 0.5 to 4 phr (part per hundred resin) to the resin composition having acrylate functionality, resulting in about 0.5 wt % to about 3.0 wt % photoinitiator in the hard coat composition, depending on the amount of solvent and other additives discussed below. More or less can be employed depending on the specific requirements such as color and cure speed.

Examples of preferred photoinitiators include bis(2,4,6-trimethylbenzoyl)-phenylphosphine oxide and 1-hydroxycyclohexylbenzophenone (e.g., Irgacure™ 819 and Irgacure™ 184 available from BASF Corp.). Preferably, 0.45 wt % of each of these photoinitiators is added to the composition. Other selected photoinitiators may be added in different amounts as required for photoinitiation, and as would be recognized by one of ordinary skill in the art.

As noted above, solvent is also added to aid in the application of the wet hard coat (15) to the base sheet (11), and the solvent evaporates upon drying. The composition of the wet hard coat (15) preferably comprises about 35 to about 40 wt % solvent. Solvents that may be used include, but are not limited, methyl ethyl ketone, methyl n-propyl ketone, methyl isobutyl ketone, n-butyl acetate, and ethyl acetate and combinations thereof.

The hard coat composition also may include other additives. For example, the film composite may be made hydrophobic to assist the run-off of water by reducing the surface energy. The reduction in surface energy also improves dirt shedding properties of the film composite. Such hydrophobic additives include silicone acrylates, preferably oligomers of silicone acrylates, and fluorinated urethane acrylates, which are typically added in amounts of up to about 4.0 wt %, and preferably about 2.0 wt %. Examples of such hydrophobic additions include CN4000 and NTX7980 (available from Sartomer LLC); Ebecryl® 1360 (available from Cytec Surface Specialties); Fluorolink® AD 1700 (available Solvay Solexis); Byk® 371, Byk® UV 3570, and Byk-Silclean® 3710 (available from BYK Chemie); CoatOSil™ 3503 and CoatOSil™ 3509 (available from Momentive Performance Materials); and Tego® Rad 2250, Tego® Rad 2500, and Tego® Rad 2600 (available from Evonik Industries).

The hard coat composition may also contain a nanoparticle dispersion therein. Nanoparticles should have a size of less than 0.1 microns in diameter. Inorganic nanoparticles such as zinc oxide and cerium oxide may provide additional ultraviolet absorption similar to the UVAs discussed above. Silicon dioxide and aluminum oxide may additionally be used to increase surface hardness and abrasion resistance as is well known to those of ordinary skill.

The embodiments described above provide a film composite with only a single hard coat layer and without the need for a primer layer or underlayer. The disclosed film composite exhibits greater adhesion to underlying layers, resulting in an improved resistance to weathering, abrasion and scratches. For example, embodiments disclosed herein have a weatherability of greater than about 2700 hours; greater than about 3000 hours; and greater than about 3300 hours. Additionally, the embodiments described herein have an abrasion resistance less than 4% as measured by change in haze (delta haze).

The presently described composite films will now be described with reference to the following non-limiting examples.

Examples 1-6

Six PET base sheets were coated as described above with the approximate hard coat composition shown below in Table 1, to produce a hard coat dry film thickness of about 9 to about 10 microns (Samples 1-6).

TABLE 1

| Hard Coat Constituent | Samples 1-6 |
| --- | --- |
| Methyl Ethyl Ketone | 24.0 wt % |
| n-Butyl Acetate | 13.3 wt % |
| Photoinitiator | 0.9 wt % |
| UV Absorber | 1.5 wt % |
| Additional UV Stabilizer | 0.3 wt % |
| Aliphatic Urethane Acrylate Resin Having Isocyanate Functional Groups | 23.0 wt % |
| Aliphatic Urethane Acrylate Resin Having Hydroxyl Functional Groups | 20.0 wt % |
| Multifunctional Acrylate | 17 wt % |

All of the samples were then dried in an oven at a temperature of about 100° C. to 105° C. for 60 seconds. The samples also were UV cured under Fusion D-bulb lamps in inert conditions under nitrogen with an oxygen concentration of between 800 to 900 parts per million at a line speed of 80 to 100 feet per minute, as described more fully above. Samples 1-6 were then weathered and tested for both adhesion of the hard coat to the PET base sheet and laminate separation as described above and according to the adhesion test described above. The samples were also tested for resistance to abrasion as a measure of change in haze (delta haze) according to the above described Taber Abrasion Test. The results of these tests are shown below in Table 2.

TABLE 2

| Sample | Thickness (Microns) | Percent (%) Change in Haze | Weatherability (Hours) | Laminate Separation (Hours) |
|---|---|---|---|---|
| 1* | 9.3 | — | >3300 | 5400 |
| 2 | 10.4 | 6.4 | >3300 | 5400 |
| 3 | 9.6 | 3.6 | >3300 | >6000 |
| 4 | 10.5 | 3.5 | >3300 | >6000 |
| 5** | 11.4 | 3.7 | >3300 | >5400 |
| 6 | 7.4 | 3.4 | >3300 | 4200 |

*Sample 1 was a laboratory sample and all the other samples were coated by machine trial.
**Sample 5 indicates that tests are continuing beyond the hours to date.

At 3300 hours, the adhesion of each sample was tested with 3M 810 tape. None of the samples had any hard coat removal or adhesion failure. This advantageously equates to about 5 to 7 years of service life of the film composite. None of the samples were tested for adhesion failure beyond the 3300 hours.

Samples 1 and 2 had a minimum life of about 5400 hours before laminate separation—i.e., the laminate started to separate and negatively affected the coating. Samples 3 and 4 were stopped at 6,000 hours without any separation of the laminate. As noted above, Sample 5 is still in the testing process but has not yet exhibited any laminate separation after about 5400 hours. Sample 6 had a minimum life of about 4200 hours before laminate separation. Additionally, for all the samples, the change in haze value after 50 cycles was less than 8.0% and generally below 4.0%.

Examples 7-10

The service life, or weatherability, of the film composite according to the present disclosure has greatly improved performance, when measured as increased weathering life and when compared to control samples. The control samples (Samples 7-10) were coated by the same procedures used for coating Samples 1-6 as discussed above. However, Samples 7-10 were prepared with coating compositions as shown in Table 3 below and Sample 9 further included a thick primer layer between the PET base sheet and the hard coat.

TABLE 3

| Hard Coat Constituent | Sample 7 | Sample 8 | Sample 9 | Sample 10 |
|---|---|---|---|---|
| Solvent | 36.8 wt % | 36.6 wt % | 36.6 wt % | 24.0 wt % |
| Urethane Acrylate Oligomer | 40.9 wt % | 32.0 wt % | 32.0 wt % | — |
| Aliphatic Urethane Acrylate Resin Having Isocyanate Functional Groups | — | — | — | 29.0 wt % |
| Aliphatic Urethane Acrylate Resin Having Hydroxyl Functional Groups | — | — | — | 29.0 wt % |
| Multifunctional Acrylate | 17.5 wt % | 26.2 wt % | 26.2 wt % | — |
| Photoinitiator | 2.9 wt % | 0.6 wt % | 0.6 wt % | 2.9 wt % |
| UV Absorber | 1.5 wt % | 1.5 wt % | 1.5 wt % | — |
| Additional UV Stabilizer | 0.3 wt % | 0.3 wt % | 0.3 wt % | — |
| Hydrophobic Additive (Fluorolink AD 1700) | — | 2.9 wt % | 2.9 wt % | — |

Samples 7-10 were then dried and cured in the same manner as described above for Samples 1-6 and tested for adhesion of the hard coat to the PET base sheet after weathering according to the methods described above. The results of this test are shown below in Table 4.

TABLE 4

| Sample | Weatherability (Hours) |
|---|---|
| 7 | 600-900 |
| 8 | 1200-1500 |
| 9 | 2700-3000 |
| 10 | Did not cure |

It can be seen that Samples 7 and 8 comprising a urethane oligomer and multifunctional acrylate cross-linked using UV light have a service life, as measured by time to adhesion failure, which is greatly inferior to that of the samples of present disclosure, when using the hard coat composition shown in Table 2 (compare Samples 1-4 to Samples 7-8). While Sample 9 achieved similar, but still slightly lower, weatherability results compared to Samples 1-6, which comprised the hard coat composition shown in Table 2, it required the use of a primer layer to achieve these results. Sample 10 had a hard coat composition containing an aliphatic urethane acrylate resin having isocyanate functional groups and an aliphatic urethane acrylate resin having hydroxyl functional groups, which were cross-linked by a polyaddition reaction between the isocyanate groups and hydroxyl groups; however, Sample 10 did not include the multifunctional acrylate. As a result, the coating composition for Sample 10 did not fully cure, was not scratch resistant, and had little or no adhesion to the base sheet material.

Examples 11-12

The service life, or weatherability, of the film composite according to the present disclosure also has greatly improved performance when compared to control samples with fluoropolymers. The fluoropolymer control samples (Samples 11 and 12) were coated by the same procedures used for coating Samples 1-6 as discussed above. However, Samples 11 and 12 were prepared with fluorinated coating compositions as shown in Table 5 below, which incorporate fluoropolymer resins (such as a fluoroethylene vinyl ether resin (e.g., Lumiflon™ LF (available from Asahi Glass) and cured by Coreactant 9L-10 (available from Dow Chemicals) which contains —NCO isocyanate groups) into hard coat compositions for coating onto a PET base sheet.

TABLE 5

| Hard Coat Constituent | Sample 11 | Sample 12 |
|---|---|---|
| Solvent | 29 wt % | 28.3 wt % |
| Fluoropolymer | 60.0 wt % | 62.5 wt % |
| Curing Agent for Fluoropolymer | 5.0 wt % | 8.1 wt % |

TABLE 5-continued

| Hard Coat Constituent | Sample 11 | Sample 12 |
|---|---|---|
| Isocyanatosilane | 2.1 wt % | — |
| UV Absorber | 2.4 wt % | 2.5 wt % |
| Additional UV Stabilizer | 0.6 wt % | 0.6 wt % |

Samples 11 and 12 were then dried and cured in the same manner as described above for Samples 1-6, which resulted in a polyaddition reaction and cross-linking between the isocyanate groups and the hydroxyl groups of the fluoropolymer. Samples 11 and 12 were also tested for adhesion of the hard coat to the PET base sheet after weathering according to the methods described above. The results of this test are shown below in Table 6.

TABLE 6

| Sample | Weatherability (Hours) |
|---|---|
| 11 | 3000 |
| 12 | 3000 |

Although Samples 11 and 12 had similar longevity to the present invention after exposure to weathering, the coatings were not hard coats in that the film composite was very susceptible to scratching and abrasion. Samples 11 and 12 had a delta haze value greater than 30% when tested according to the above described Taber Abrasion Test. Additionally, the coatings were brittle and cracked on the PET film when the film was wrapped onto rollers for storage.

As can be seen by comparing the performance of Samples 1-6 to the control samples (Samples 7-12), the present disclosure provides for a film composite having a single, superior hard coat which has both longer service life and improved resistance to abrasion and scratching.

Example 13

As noted above, the hard coat composition may also include further additives; for example, the hard coat may be made hydrophobic to assist the run-off of water and dirt by reducing the surface energy of the film composite. An example of a hard coat composition that is both hydrophobic and oleophobic is given in Table 7 below. In Sample 13, the composition includes a fluorinated urethane acrylate additive (e.g., Fluorolink AD 1700™ available from Solvay Solexis) ("hydrophobic additive") with the composition being applied to a PET base sheet in the same manner as described above and with the hydrophobic additive being added to the composition prior to the curing in an inert atmosphere under nitrogen.

TABLE 7

| Hard Coat Constituent | Sample 13 |
|---|---|
| Methyl Ethyl Ketone | 22.9 wt % |
| n-Butyl Acetate | 13.0 wt % |
| Photoinitiator | 0.9 wt % |
| UV Absorber | 1.5 wt % |
| Additional UV Stabilizer | 0.3 wt % |
| Aliphatic Urethane Acrylate Resin Having Isocyanate Functional Groups | 22.6 wt % |
| Aliphatic Urethane Acrylate | 20.0 wt % |

TABLE 7-continued

| Hard Coat Constituent | Sample 13 |
|---|---|
| Resin Having Hydroxyl Functional Groups | |
| Dipentaerythritol Pentaacrylate | 17 wt % |
| Hydrophobic Additive (Fluorolink AD 1700) | 1.8 wt % |

Sample 13 was then dried and cured in the same manner as described above. The surface energy of the film composite was then tested according to the above described method and compared to the surface energy of Sample 9. The results of this test are shown below in Table 8.

TABLE 8

| Sample | Surface Energy |
|---|---|
| 9 | 45 mJ/m$^2$ |
| 13 | 16 mJ/m$^2$ |

Table 8 shows that the surface energy of the composite film was reduced significantly by the inclusion of the fluorinated urethane acrylate additive. As a result, the composite film has low dirt retention and is very easy to clean. It is expected that the addition of the fluorinated additive to the coating compositions of any of the above Samples will have a similar effect in reducing surface energy.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A weather resistant film composite comprising:
a base sheet comprising at least one polyester film layer, the polyester film layer having an exterior surface; and
a dual-cured hard coat layer disposed on the exterior surface of the polyester film layer, wherein the dual-cured hard coat is formed from a composition comprising:
a multifunctional acrylate;
an aliphatic urethane acrylate resin having isocyanate functional groups and an isocyanate content of about 6.5 to about 7 percent, as measured in accordance with DIN-EN ISO-11 909;
an aliphatic urethane acrylate resin having hydroxyl functional groups and a hydroxyl value of about 75 to about 110 mg KOH/g;
an ultraviolet stabilizer; and
a photoinitiator;

wherein the dual-cured hardcoat layer is adhered to the exterior surface of the polyester film layer of the base sheet without the need for a second hard coat or primer layer.

2. The film composite of claim 1, wherein the multifunctional acrylate is a monomer or oligomer acrylate selected from the group consisting of: dipentaerythritol pentaacrylate, pentaerythritol tetraacrylate, pentaerythritol triacrylate, ditrimethylolpropane tetraacrylate, trimethylolpropane triacrylate, tricyclodecane dimethanol diacrylate, 1,6-hexanediol diacrylate, cyclohexane dimethanol diacrylate, dioxane glycol diacrylate, and combinations thereof.

3. The film composite of claim 2, wherein the multifunctional acrylate comprises dipentaerythritol pentaacrylate.

4. The film composite of claim 3, which has a weatherability exceeding 3000 hours before loss of adhesion between the base sheet and the hard coat.

5. The film composite of claim 1, wherein the hard coat layer has an abrasion delta haze of less than about 4 percent as measured by a taber abrasion test.

6. The film composite of claim 1, wherein the hard coat layer has a dry film thickness of about 6 microns to about 14 microns and the exterior surface of the film layer has been treated by at least one of chemical treatment, oxidation, or roughening.

7. The film composite of claim 6, wherein the hard coat layer has a dry film thickness of about 9 microns to about 12 microns.

8. The film composite of claim 1, wherein the at least one polyester film layer comprises polyethylene terephthalate.

9. The film composite of claim 1, wherein the base sheet comprises an ultraviolet absorber.

10. The film composite of claim 1, wherein the hard coat composition comprises up to about 3.5 weight percent of an organic ultraviolet stabilizer.

11. The film composite of claim 10, wherein the organic ultraviolet stabilizer comprises up to about 2 weight percent of an organic ultraviolet absorber.

12. The film composite of claim 11, where the film composite has a visible light transmission of about 5 percent to about 85 percent.

13. The film composite of claim 1, wherein the film composite is applied to the external surface of a window.

14. The film composite of claim 1, wherein the hard coat composition further comprises up to about 4 weight percent hydrophobic material.

15. A hard coat composition for improving the weather and abrasion resistance of a base sheet with a polyester film layer as an exterior surface of one side of the base sheet, comprising:

a multifunctional acrylate selected from the group consisting of: dipentaerythritol pentaacrylate, pentaerythritol tetraacrylate, pentaerythritol triacrylate, ditrimethylolpropane tetraacrylate, trimethylolpropane triacrylate, tricyclodecane dimethanol diacrylate, 1,6-hexanediol diacrylate, cyclohexane dimethanol diacrylate, dioxane glycol diacrylate, and combinations thereof; and dual-curable resin comprising:
an aliphatic urethane acrylate resin having isocyanate functional groups has an isocyanate content of about 6.5 percent to about 7.0 percent, as measured in accordance with DIN-EN ISO-11 909; and
an aliphatic urethane acrylate resin having hydroxyl functional groups has a hydroxyl value of about 75 to about 110 mg of KOH/q;
wherein the ratio of isocyanate functional groups to hydroxyl functional groups is about 1.1 to 1.

16. The hard coat composition of claim 15, wherein the multifunctional acrylate comprises dipentaerythritol pentaacrylate.

17. The hard coat composition of claim 15, wherein the hard coat composition is cured in a two-stage process.

18. A weather resistant film composite comprising:
a base sheet comprising at least one polyethylene terephthalate film layer, the film layer having an exterior surface; and
a dual-cured hard coat disposed on the exterior surface of the film layer, wherein the dual-cured hard coat is formed from a composition comprising:
a multifunctional acrylate; an aliphatic urethane acrylate resin having isocyanate functional groups and an isocyanate content of about 6.5 to about 7 percent, as measured in accordance with DIN-EN ISO-11 909;
an aliphatic urethane acrylate resin having hydroxyl functional groups and a hydroxyl value of about 75 to about 110 mg KOH/g;
an ultraviolet stabilizer; and
a photoinitiator;
wherein the dual-cured hardcoat layer is adhered to the exterior surface of the polyethylene terephthalate film layer of the base sheet without the need for a second hard coat or primer layer.

19. The film composite of claim 18, wherein the ratio of aliphatic urethane acrylate resin having isocyanate functional groups to aliphatic urethane acrylate resin having hydroxyl functional groups is about 1.1 to 1.

* * * * *